W. W. JILLARD.
FASTENER.
APPLICATION FILED MAR. 14, 1919.

1,328,628.

Patented Jan. 20, 1920.

Inventor,
William W. Jillard,
by his Attorneys,
Howson & Howson

UNITED STATES PATENT OFFICE.

WILLIAM WILMOT JILLARD, OF PHILADELPHIA, PENNSYLVANIA.

FASTENER.

1,328,628.　　　　Specification of Letters Patent.　　Patented Jan. 20, 1920.

Application filed March 14, 1919. Serial No. 282,650.

*To all whom it may concern:*

Be it known that I, WILLIAM WILMOT JILLARD, a citizen of the United States, residing in Philadelphia, Pennsylvania, have invented Fasteners, of which the following is a specification.

My invention relates to fasteners, and particularly to a type of fastener which may be employed for the fastening of collars and the like. One object of my invention is to furnish a fastening device which may be used in place of the old type of collar button, and which may be permanently attached to the collar band of a shirt, such fastener being so formed as not to interfere with the proper laundrying of the shirt. Another object is to supply a fastener of the sort specified which, though permanently attached to the shirt, does not interfere with the use in said shirt of collar buttons of the old type, should such use be desired. A still further object is to furnish a fastener of simplified form and relatively low cost which may be used generally as a fastening means, which is easily and permanently attached to the article in connection with which it is being used, and which in any connection insures absolute comfort and maximum efficiency to the user.

Figure 1:
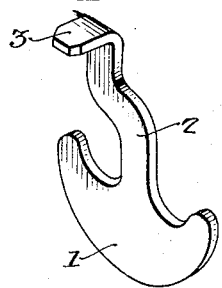
Figures 1 and 3 are views in perspective illustrating one form of my fastener.
Figure 2:
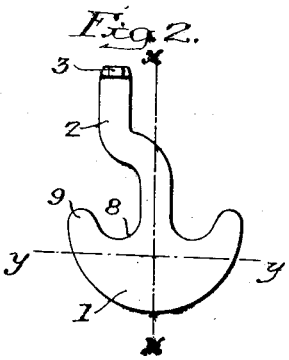
Fig. 2 is a view in side elevation of the fastener shown in Figs. 1 and 3.
Figure 3:
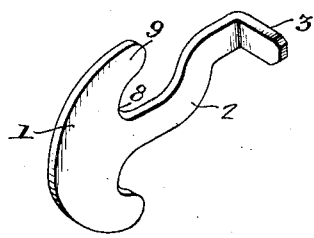

As illustrated in Figs. 1, 2 and 3, the body of the fastener is substantially anchor shaped and flat, it being stamped preferably from a metal sheet of the thickness desired. The fastener comprises a substantially crescent shaped head, 1, from the concave edge of which a curved or bent shank, 2 extends, said shank being so disposed that the outer end thereof is offset with respect to the short axis, $x$—$x$, of the head, 1, said outer end lying substantially opposite to or above one of the projecting tips 9, of the crescentic head, as clearly indicated in Fig. 2. In the present instance, I have shown that portion of the shank adjoining the head, 1, extending for a short distance substantially perpendicular to the long axis, $y$—$y$, of the head; but shortly bending away from this perpendicular the shank 2, extends at an angle thereto in such manner that its outer extremity is located at one side of the short axis, $x$—$x$, of the head. This outer extremity 3, of the shank is bent over so as to extend substantially at right angles to the plane of the body of the fastener.

Figure 4:
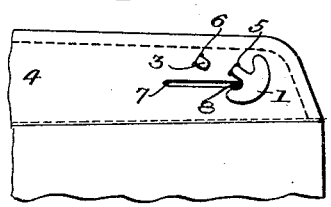
Fig. 4 is a view showing a section of the collar band of a shirt at the front with the fastener attached.
Figure 5:
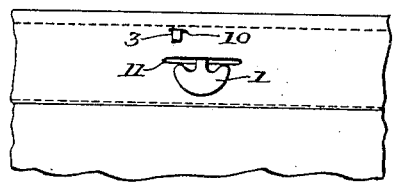
Fig. 5 is a view of a section of a collar band at the rear illustrating the fastener attached thereto.
Figure 6:
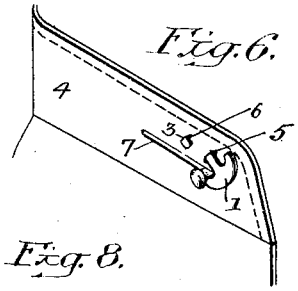
Figs. 6 and 7 are views similar to those of Figs. 4 and 5 respectively but illustrating the use of collar buttons of the old type in shirts to which my fastener is attached.

Figs. 4 and 5 illustrate the manner in which the fastener is attached respectively at the front and the rear of the collar band of a shirt in which positions they are adapted to the work of retaining a collar in place. In attaching the fastener at the front of the band, 4, two eyelets, 5 and 6, are formed in the collar band, their location being above the button hole, 7, formed for the reception of a collar button of the old type. These eyelets are formed preferably only in the outer layers of the material of the collar band so that a protective layer of cloth is left between the fastener and the skin of the wearer. The shank, 2, is inserted into the eyelet, 5, the bent out end, 3, of the shank extending through the eyelet, 6, said end then being beaded over so as to pinch the material of the shirt and thereby hold the fastener permanently affixed to the shirt. The fastener is so located in the collar band that the outer end of the button hole, 7, coincides with the recess, 8, formed between the projecting end, 9, of the head of the fastener and the shank, 2, such disposition serving the dual purpose of permitting the use of collar buttons of the old type without interference from the fastener, and at the same time furnishing a reinforcement for the button hole should such collar button be employed. Fig. 6 illustrates the use of a collar button of the old type in a shirt equipped with the fastener, and it will be apparent that because of the extreme flatness and disposition of the fastener there is no resulting interference.

Figure 7:
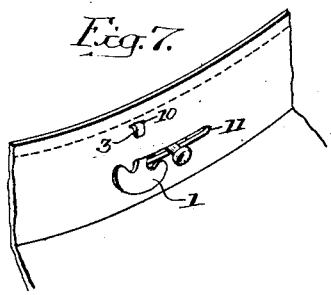

In attaching the fastener at the back of the collar band, as illustrated in Fig. 5, it is only necessary, in shirts of the usual type, to form one eyelet, 10, the shank being inserted first through the button hole, 11, formed for the reception of a button of the old type. As in the front, the end, 3, of the shank extends out through the eyelet, 10, and is beaded over to pinch the material of the collar band. In normal position, shown in Fig. 5, the head, 1, of the fastener is centered below the button hole, 11, the location of the eyelet, 10, together with the offset feature of the end, 3, of the shank being such as to accomplish such centering. When, however, it is desired to use the old type collar button, the head of the fastener may be moved to the position shown in Fig. 7, in which position it is removed from any possible interference with said button.

Figure 9:
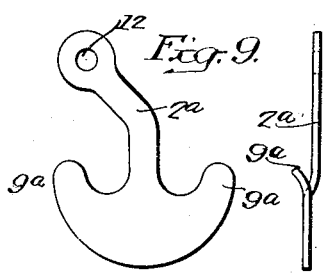
Fig. 9 is a view in side elevation of a modified form of my fastener.
Figure 10:
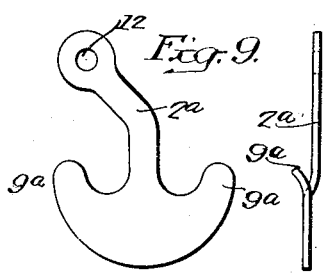
Fig. 10 is a view in end elevation of the fastener shown in Fig. 9.

In Fig. 9 I have illustrated a modified form of fastener, in which the outer extremity of the shank is perforated. In attaching this fastener to the collar the shank is inserted in the material, as before, but instead of the beaded over extremity of the shank, stitches are taken through the material and through the perforation, 12, in said extremity, thereby tacking the fastener to the material. In this case I have shown the shank 2ª, bent slightly out of the plane of the head of the fastener, and the tips, 9ª, of the crescent shaped head bent out in direction reverse of that of the shank, thereby better accommodating the various layers of the material to which it may be attached.

My fastener is made preferably of a non-corroding metal, such as nickel-silver, sterling silver, or gold filled mixtures, thus eliminating the possibility of the formation of rust when the shirt is washed. In this connection, the fastener does not interfere in any way with the proper laundrying of the shirt since it lies substantially flat and may be put through any washing machine or wringer. The many advantages of a fastener of this type will be apparent. Being smooth and flat it cannot dig into the neck of the wearer and gives absolute comfort, while the feature of its permanent connection guarantees its presence at all times, since, like the ordinary button, it cannot be mislaid or lost. Further, the old type collar button may be used with the same facility in a shirt equipped with these fasteners as in a shirt which lacks this equipment, while the simplicity of the device and the ease with which it may be attached to any article makes it an invaluable asset.

Figure 8:
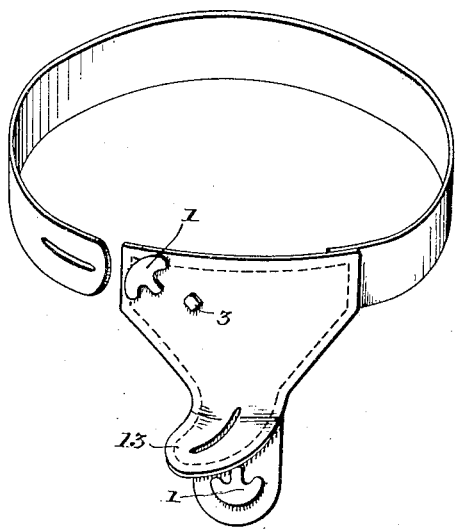
Fig. 8 is a view in perspective of a garter upon which my fastener is employed as the garter and the stocking retaining means.

It will be understood that the use of the fastener is not limited to collars since it may be used to advantage upon numerous articles, and in many cases it will be found to be a great improvement over the present form of fastener. In Fig. 8 I have illustrated the fastener employed in connection with a garter, in which connection it is particularly valuable in that the metal hasp usually employed may be done away with, this hasp being replaced by a fabric flap, 13.

I claim:

1. A garment fastener comprising a substantially crescentic, flat head, a shank extending from the concave edge of said head, the outer extremity of said shank being disposed to one side of the short axis of the head and lying substantially opposite one of the projecting tips of said crescentic head, and means at said outer extremity of the shank for securing the fastener to a garment.

2. A garment fastener comprising a crescentic flat head, a shank extending from the concave edge of said head and having therein a lateral bend so that the outer extremity of the shank lies on one side of the short axis of the head, said outer extremity of said shank being perforated whereby said fastener may be secured to a garment.

3. A garment-fastener comprising a substantially crescentic flat head, a shank extending from the center of the concave edge of said head, the base portion of said shank lying along the short axis of said head and the outer portion of the shank being offset laterally from said base portion, and means at the outer extremity of said outer portion for securing the fastener to a garment.

WILLIAM WILMOT JILLARD